May 22, 1962
E. E. HAYS
3,035,979
PHARMACEUTICAL COMPOSITION CONTAINING
A RESIN-NARCOTIC COMPOUND AND A
RESIN-ANTIHISTAMINE COMPOUND
Filed April 15, 1959
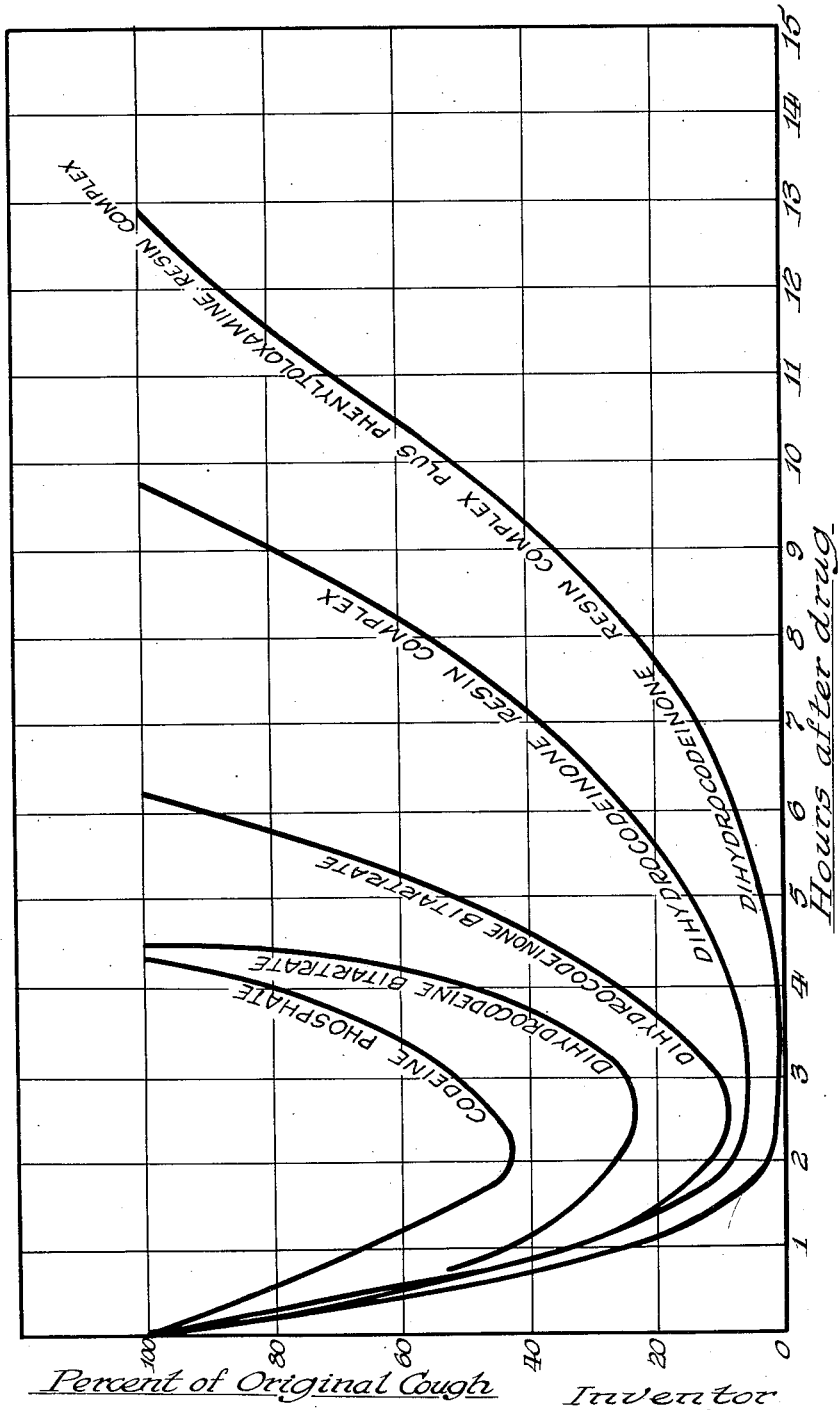
Inventor
Edwin E. Hays
by Zabel, Baker, York, Jones & Dithmar
Attorneys

3,035,979
PHARMACEUTICAL COMPOSITION CONTAINING A RESIN-NARCOTIC COMPOUND AND A RESIN-ANTIHISTAMINE COMPOUND
Edwin E. Hays, Rochester, N.Y., assignor to Wallace & Tiernan Inc., a corporation of Delaware
Filed Apr. 15, 1959, Ser. No. 806,704
7 Claims. (Cl. 167—72)

This invention relates to pharmaceutical preparations containing resin adsorption products of morphine and morphine derivatives. More particularly the invention relates to pharmaceutical compositions containing a resin-narcotic compound and a resin-antihistamine compound.

This application is a continuation-in-part of my co-pending allowed application Serial No. 597,541, filed July 12, 1956, now abandoned.

An object of the invention is to provide a narcotic preparation in dosage unit form such as in a capsule, tablet, or suspension which can be administered orally to a patient at prolonged intervals, such as once or twice a day, and which will have an analgesic and/or antitussive effect over such a long period of time without deleterious effects.

Another object is to provide a water insoluble resinous reaction product of a narcotic salt which is at least twice as effective in a daily dose as the narcotic salt itself.

I have discovered that the above objects can be accomplished through the use of a sulfonic acid cation resin having adsorbed (ionically bound) thereon a cation of a narcotic morphine compound, such as a cation of one or more of the salts of morphine, codeine, dihydrocodeine, dihydrocodeinone, and morpholinoethyl morphine.

Particularly satisfactory antitussive results are obtained by using a mixture of the sulfonic acid cation exchange resin adsorption compound of the above mentioned narcotics with a dialkylamino ethoxy antihistamine compound, such as phenyltoloxamine, Benadryl (2-(benzhydryloxy)-N,N-dimethylethylamine hydrochloride), or the like, and particularly with the sulfonic acid cation exchange resin adsorption compound of such antihistamines. Methods of preparing these resinous antihistamine adsorption compounds are described in my co-pending application Serial No. 571,599, filed March 15, 1956, now abandoned. Addition of the antihistamine resin adsorption compound to the narcotic resin adsorption compound potentiates the cough suppressing ability of the narcotic-resin compound. It also prolongs the effect.

The compounds which have superior antitussive effect over other morphine compounds are the resinous adsorption compound of dihydrocodeinone and the mixture of the dihydrocodeinone adsorption compound with the above mentioned antihistamine resinous adsorption compound. The dosage unit as a cough suppressant for these preparations is a minimum of approximately 1 mg. of preparation on the basis of dihydrocodeinone. The maximum dosage in order to avoid deleterious side effects, such as nausea, etc., is approximately 60 mgs. of the dihydrocodeinone. The mixture with the antihistamine can suitably contain from 5 to 200 mgs. of antihistamine.

The dihydrocodeinone resin adsorption compound alone or with the dialkylamino ethoxy antihistamine resin is suitably given to the patient in 5 mg. amounts (on the basis of the amount of drug base) once every 12 hours. Compare this with the normal dosage of 8 mg. of dihydrocodeinone bitartrate given every 2 to 4 hours, which dosage, as shown below, is not as effective as the resin compound.

The dihydrocodeine resinous adsorption compound for antitussive effect can suitably be used in amount containing from 5 to 100 mgs. of dihydrocodeine. For antitussive effect the daily dosage is about 20 mg. on the basis of the dihydrocodeine.

For analgesia 30 mg. of the resin is administered orally once every 12 hours and gives superior effect over the normal daily dosage of 30 mg. of codeine phosphate every 2 to 4 hours.

The morphine in the morphine resin compound can suitably be present in from 2 to about 30 mg. This compound has both high antitussive and analgesic effect, but because of its habit-forming characteristic is not often used. However, by the use of the resin the daily effective dose is greatly reduced.

The codeine resinous adsorption compound, like codeine itself, has little antitussive effect, but is particularly valuable as an analgesic. For this latter purpose it is suitably present in the resinous adsorption compound in from 3 mgs. to 120 mgs. The antihistamine compound, when present, enhances its analgesic effect.

The morpholinoethyl morphine and the morpholinoethyl morphine resinous adsorption compound are more potent than codeine and the codeine resinous adsorption compound as antitussives, being approximately two to three times more potent than codeine but not as potent as the dihydrocodeinone. Furthermore the formation of the resin adsorption compound produces a longer duration of effect than the unadsorbed morpholinoethyl morphine, and the duration and also the intensity of the effect is potentiated when phenyltoloxamine or Benadryl (2-(benzhydryloxy)-N,N-dimethylethylamine hydrochloride) is added. According to tests morpholinoethyl morphine and its resinate are potentiated by phenyltoloxamine to the same extent as dihydrocodeinone.

A suitable unit dose of morpholinoethyl morphine resinate on the basis of the morpholinoethyl morphine is 1 mg. to 120 mg. with 5 mg. to 200 mg. of a dialkylamino ethoxy antihistamine. A specific example is 15 mg. of morpholinoethyl morphine as the resin compound with 10 mg. of phenyltoloxamine as the resin compound.

The cough suppressing action of codeine, dihydrocodeine, dihydrocodeine-resin adsorption product and antihistamine resin mixture was tested by feeding coughing dogs capsules containing 2.2 mg. each of the narcotic-resin adsorption compound. In the case of the mixture the capsule contained 2.2 mg. of the narcotic in the narcotic-resin adsorption compound mixed with 2.2 mg. of phenyltoloxamine in the resin adsorption compound. A capsule containing 2.2 mg. of phenyltoloxamine as the phenyltoloxamine resin adsorption compound was also fed to the dogs. The reduction in coughing was determined by counting the coughs per unit time on dogs before and after giving them the capsules and thus determining the percent of original coughs.

The following results were obtained:

*2.2 mg. phenyltoloxamine as resin adsorption compound.*—This compound had no effect on reducing coughing.

*2.2 mg. codeine.*—The percent of original coughs was reduced from 100% to a minimum of 40% in 2½ hours and then gradually returned to 100% in about 4 hours.

*2.2 mg. dihydrocodeine.*—This compound was similar to codeine in its cough suppressing action except that it was more effective in reducing coughs, cutting them down to a minimum of 25% in about 3 hours but losing its effectiveness and returning to 100% in approximately 5 hours.

*6.6 mg. dihydrocodeine-resin adsorption compound (2.2 mg. of dihydrocodeine).*—This compound reduced coughs to 40% in 4 hours similar to codeine and then substantially maintained its effect for 6 hours, not returning to 100% until about 8 hours.

*6.6 mg. of dihydrocodeine-resin (2.2 mg. dihydrocodeine) mixed with 5.8 mg. phenyltoloxamine resin (2.2*

*mg. phenyltoloxamine*).—This mixture of compounds reduced coughing to about 40% in 2 hours and then maintained its effect at 40% for over 8 hours, going to 50% in 10 hours, and 100% in 12 hours.

*.37 mg. of dihydrocodeinone.*—This compound reduced coughing to about 10% of the original cough in about 2 to 3 hours, thus being much more effective than dihydrocodeine or codeine. It quickly returns to the 100% level in approximately 6 hours.

*1.1 mg. of dihydrocodeinone-resin adsorption compound (.37 mg. of dihyddrocodeinone).*—This compound reduced coughing to approximately the 5% level in 2 hours, maintained it at about 5% for the next 2 hours, and then slowly lost its effectiveness, returning to the 100% level in approximately 10 hours. It is thus far superior in a much less quantity than the dihydrocodeine resin and superior in equal quantity to the dihydrocodeinone.

*1.1 mg. of dihydrocodeinone-resin adsorption compound mixed with 5.8 mg. of phenyltoloxamine resin adsorption compound (2.2 mg. of phenyltoloxamine).*—This mixture reduced coughing to practically zero in 2 hours, maintained this high effect over a 4 hour period, was still over 50% effective after 10 hours, and did not completely lose its effectiveness for 13 hours. Similar results were obtained with the mixture of dihydrocodeinone resin with the Benadryl (2-(benzhydryloxy)-N,N-dimethylamine hydrochloride) resin compound.

The tests showed that the dihydrocodeine and dihydrocodeinone resin adsorption compounds were much more effective than the free drugs in maintaining the cough suppression effect over a prolonged period of time and that the mixture with the dialkylamino ethoxy antihistamine resin was even better. The dihydrocodeinone resin compound alone or in admixture with the antihistamine resin was far superior to the dihydrocodeine resin compositions. In fact, the dihydrocodeinone resin compositions practically eliminated coughing for several hours, an effect not attained or even approached in the testing of the pure compounds.

FIG. 1 of the drawing is a graphic chart in which the percent reduction of coughing in dogs is plotted against the hours after administration of the drug. It is a graphic representation of the above described tests.

Many types of cation exchange resins capable of reacting with morphine type compounds have been described in the literature and are sold under various trade names. The carboxylic type cation exchange resins are well known and will react with narcotic compounds, such as codeine and the like, to give antitussive adsorption compounds, but such compounds hydrolyze too quickly and are little, if any, better than the narcotic by itself. The sulfonic acid cation exchange resins have been found to be very suitable in that they react with codeine, dihydrocodeine, morpholinoethyl morphine and dihydrocodeinone to give adsorption compounds which hydrolyze slowly and maintain their antitussive effect over a prolonged period of time. All sulfonic acid cation exchange resins have this effect, including, to a lesser extent, the carboxylic sulfonic acid cation exchange resins. Particularly satisfactory results have been obtained with the sulfonic acid cation exchange resins disclosed in D'Alelio Patent No. 2,366,007, referred to in this patent as water-insoluble sulphonated polymerizate of poly-vinyl aryl compounds. Other suitable sulfonic acid cation exchange resins are disclosed in U.S. Patents Nos. 2,204,539, 2,228,159, and 2,729,607.

The cross linkage of the sulfonic acid resins is substantially between 3 and 17%, and preferably 5 to 10%, in order to slow down the rate of diffusion of stomach and intestinal juices into the resin. The particle size is of lesser importance, but improved slowing of hydrolysis is obtained with particle size of between 20 to 50 mesh rather than at 100 mesh. However 200 mesh particle size has been found to be satisfactory.

An illustrative example of a suitable cation exchange resin adsorption product is given below, A representing the resin nucleus of a sulfonic acid cation exchange resin which is ionically bound to the cation of dihydrocodeinone.

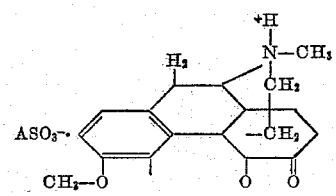

In the following examples IR–120 refers to a sulfonic acid cation exchange resin, 7 to 8% cross-linked, having a particle size such that substantially all particles pass through a 20 mesh screen and are retained on a 50 mesh screen, and made in accordance with Example 1 of U.S. Patent No. 2,366,007, except that 7.5 parts of divinyl benzene are used instead of the 10 parts. XE–69 refers to the same resin as IR–120 except that substantially all particles pass through an 80 mesh screen and are retained on a 200 mesh screen.

EXAMPLE I

The adsorption compound was prepared by suspending 5.0 gms. of IR–120 in about 60 ml. of dist. water. Add 1.0 gm. of dihydrocodeine bitartrate and an equal amount of 0.1 N HCl. Mix well to dissolve. Stopper and shake occassionally. Filter off clear solution on medium porosity sintered glass, wash with about 300 ml. of dist. water and dry overnight in 60° C. oven.

The compound contained 11.41% by weight of dihydrocodeine.

A sample of .8275 gm. of the above resin adsorption compound equivalent to 94.42 mg. of dihydrocodeine was tested for its hydrolyzing rate in simulated gastric juice (acid) and intestinal juice (base) with the following results:

Percent eluted by acid_____ 29.77% in 3 hrs.
Percent eluted by base_____ 19.41% in 3 hrs.

Total percent eluted_____ 49.18% over 6 hrs.

EXAMPLE II

The adsorption compound was prepared by dissolving 2.00 gms. (r 1.336 gms. alkaloid) dihydrocodeine bitartrate in about 80 ml. of distilled water. pH 3.65. Add 0.2 M NaOH until pH reached 7.0 (ca. 25 mls.). Stir for 10 minutes to allow pH to equilibrate at 7.0. Add 4.00 grams of IR–120 H+, stopper and allow to stand with occasional shaking.

The compound contained 22.09% by weight of dihydrocodeine.

A sample of 1.000 gm. of the above resin adsorption compound equivalent to 220.9 mg. of dihydrocodeine was tested for its hydrolyzing rate in simulated gastric juice (acid) and intestinal juice (base) with the following results:

Percent eluted by acid_____ 40.07% in 3 hrs.
Percent eluted by base_____ 45.65% in 7 hrs.

Total percent eluted_____ 85.72% over 10 hrs.

EXAMPLE III

The adsorption compound was prepared by dissolving 6.000 gms. of dihydrocodeine bitartrate in 100 ml. of water. pH 3.48. Adjust pH to 8 with .2 M NaOH. Mix for 10 minutes and then add 12.000 gms. of XE–69 in the hydrogen cycle. Mix for 1 and ½ hours. Wash and decant and dry over a week end.

The compound contained 19.16% by weight of dihydrocodeine.

EXAMPLE IV

The adsorption compound was prepared by suspending 8.00 gms. of dried IR-120 in the hydrogen cycle in about 100 mls. of distilled water and stir for about 1 hour. Dissolve 5.00 gms. of dihydrocodeinone bitartrate in about 400 mls. of distilled water and add to resin slurry. Continue stirring for 3 hours.

The compound contained 26.22% by weight of dihydrocodeinone.

A sample of 1.000 gm. of the above resin adsorption compound equivalent to 262.2 mg. of dihydrocodeinone was tested for its hydrolyzing rate in simulated gastric juice (acid) and intestinal juice (base) with the following results:

Percent eluted by acid_____ 26.11% in 3 hrs.
Percent eluted by base_____ 36.81% in 6 hrs.

Total percent eluted_____ 62.92% over 9 hrs.

EXAMPLE V

The adsorption compound was prepared by suspending 8.00 gms. of dried IR-120 resin in the hydrogen cycle in about 100 mls. distilled water and stirring for about one hour. Dissolve 5.00 gms. of codeine phosphate in about 200 mls. of distilled water and add to resin slurry. Continue stirring for about three hours.

The compound contained 27.50% by weight of codeine.

A sample of 1.000 gm. of the above resin adsorption compound equivalent to 275.0 mg. of codeine was tested for its hydrolyzing rate in simulated gastric juice (acid) and intestinal juice (base) with the following results:

Percent eluted by acid_____ 29.43% in 3 hrs.
Percent eluted by base_____ 40.63% in 8 hrs.

Total percent eluted_____ 70.06% over 11 hrs.

EXAMPLE VI

The adsorption compound was prepared by slurrying 8.00 gms. of XE-69 resin in the sodium cycle with about 100 mls. of distilled water and stirring for ½ hour. Dissolve 5.00 gms. of codeine phosphate in a minimal amount of distilled water (about 7.00 mls.). Add slowly with stirring to the resin slurry. pH of reaction mass 4.90. Stir for 6 hours and allow to stand overnight. Filter off and wash well. Place in 60° C. oven to dry.

The compound contained 25.13% by weight of codeine.

A sample of 1.000 gm. of the above resin adsorption compound was tested for its hydrolyzing rate in simulated gastric juice (acid) and intestinal juice (base) with the following results:

Percent eluted by acid _____ 45.29% in 3 hrs.
Percent eluted by base _____ 7.33% in 3 hrs.

Total percent eluted _____ 52.62% over 6 hrs.

EXAMPLE VII

The adsorption compound was prepared by dissolving 9.0 gms. of dihydrocodeine bitartrate in about 200 ml. of dist. water. Adjust pH to 3.00 with .1 N hydrochloric acid. Slurry 20.0 gms. of XE-69 in the sodium cycle in about 100 ml. of dist. water for ½ hour. Mix XE-69 with drug and stir for 3 hours. Let stand overnight. Decant, wash and dry.

The compound contained 16.27% by weight of dihydrocodeine.

Manufacture of Phenyltoloxamine Resin Complex

An example of the method used to manufacture this resin complex is as follows:

100 lbs. of XE-69 cation exchange resin in the sodium cycle is suspended in 100 gals. of deionized water. To this solution are added sufficient quantities of hydrochloric acid to adjust the pH to between 1 and 2. After stirring for a period of 30 min., 100 lbs. of phenyltoloxamine dihydrogen citrate are added, and the resulting mixture stirred for several hours. It is allowed to stand overnight, and the supernatant solution is decanted, after which the remainder of the solution is removed by filtration. The wet resin complex cake is resuspended in 100 gals. of deionized water, stirred with a mechanical stirrer for at least 30 min. and filtered. This process is repeated once. The resulting semi-dry cake is spread in thin layers and dried at approximately 55° C. overnight. After drying, it is powdered and assayed, and the resulting dry resin complex is then ready for use.

Rate of Release of Phenyltoloxamine From Its Resin Complex

The following table records experiments which illustrate the rate of release of phenyltoloxamine from the resin complex utilizing simulated gastric and intestinal juices in the sequence normally encountered in the gastrointestinal tract of man. The eluate was passed at a rate of approximately .8 ml. through a sample of the resin complex placed in the apparatus.

*Elution Data Percentages*

[27 mm. tube diameter. Room temperature. Flow rate—50 ml./hr.]

| Batch No. | Available Phenyltoloxamine, mg. | Gastric Juice | | | | Intestinal Juice | | | | Total Eluted 6 hr. |
|---|---|---|---|---|---|---|---|---|---|---|
| | | 1 hr. | 2 hr. | 3 hr. | Total 3 hr. | 1 hr. | 2 hr. | 3 hr. | Total 3 hr. | |
| H-0092 | 129 | 6.2 | 6.3 | 6.0 | 18.5 | 7.1 | 7.3 | 6.6 | 21.0 | 39.5 |
|  | 102.9 | 6.7 | 7.3 | 6.6 | 20.6 | 6.4 | 6.2 | 6.2 | 19.0 | 39.6 |
| H-0095 | 104.4 | 6.6 | 7.1 | 6.3 | 20.0 | 8.9 | 7.1 | 5.7 | 21.7 | 41.7 |
|  | 94.86 | 7.1 | 7.9 | 7.0 | 22.0 | 9.8 | 9.6 | 7.9 | 27.3 | 49.3 |
| H-0091 | 102.6 | 8.4 | 7.8 | 7.4 | 23.6 | 9.2 | 9.7 | 8.2 | 27.1 | 40.7 |
| H-0096 | 110.6 | 6.5 | 6.2 | 5.9 | 18.6 | 7.0 | 7.1 | 6.0 | 20.1 | 38.7 |
| H-0087 | 99.9 | 10.0 | 4.6 | 4.7 | 19.3 | 5.4 | 6.6 | 6.1 | 18.1 | 37.4 |
| MX-471 | 104.4 | 5.8 | 5.4 | 5.3 | 16.5 | 7.2 | 7.7 | 7.2 | 21.1 | 37.6 |
|  | 104.4 | 5.6 | 4.9 | 5.7 | 16.2 | 7.4 | 8.2 | 8.0 | 23.6 | 39.8 |

Preparation of Morpholinoethyl Morphine Resin Complex

A 4.0 kg. quantity of dried (4–8% moisture content) XE-69 (Na+) resin was slurried with 20 liters deionized water and allowed to stand for one half hour to ensure hydration of the resin. The water volume was increased to 30 liters and stirring commenced. A 1.0 kg. quantity of morpholinoethyl morphine alkaloid (Merck) was added to the resin slurry and the stirring continued for 6 hours.

Upon completion of stirring, the resin was allowed to settle for one half hour and the supernatant decanted by suction. The resin complex was then washed twice with 30 liter volumes of deionized water by resuspending the resin, stirring for 15 minutes and allowing to settle for one half hour followed by decantation.

Following the final wash, the resin complex was transferred to Buchner funnels and then oven dried at 60° C. until a moisture content of 4–8% was attained. The yield was 4.55 kg. resin complex, which assayed at 19.34% morpholinoethyl morphine.

*Morpholinoethyl Morphine*

ELUTION STUDIES

[27 mm. tube diameter. Room temperature. Flow rate—50 ml./hr.]

| Batch No. | Gastric Juice | | | | Intestinal Juice | | | 6 hr. Total |
|---|---|---|---|---|---|---|---|---|
| | 1 hr. | 2 hr. | 3 hr. | 3 hr. Total | 4 hr. | 5 hr. | 6 hr. | |
| 101-1 | .9 | .6 | .5 | 2.0 | 12.5 | 17.5 | 12.3 | 61.4 |
| | .9 | .6 | .5 | 2.0 | 15.5 | 18.3 | 12.8 | 65.5 |

The resin complexes of this invention can be used as such or they can be mixed with other pharmaceutically compatible ingredients or excipients. For example, it may be desired to give the complex in capsules, pills, tablets, or as a powder, or even in syrups, elixirs, or emulsions. The resin complex can be intermixed with flavoring and coloring materials, clay bentonite, antacids such as hydrated magnesium or aluminum oxides, aluminum phosphates, magnesium trisilicate, bismuth suboxide, zirconium subcarbonates, sodium alginate, emollients such as methyl cellulose, gastric mucin, carboxy methyl cellulose, sulfated gluten and the like, or with naturally occurring gums and mucilages, gelatin amino acids and their salts, peptones, peptides, or with any other ingredients cooperative therewith and not incompatible therewith.

One of the most important aspects of this invention is an aqueous suspension of the narcotic resin adsorption compound. Hitherto, narcotic compounds have been orally administered in the form of capsules or tablets. The powdered water insoluble resinous compounds of this invention are particularly adapted to be mixed with syrups, such as, for example, syrups made with glucose, sucrose, or glycerin, and thus can be given to the patient in liquid form.

Following is an example of a suitable narcotic amine resin syrup:

150 gms. dihydrocodeinone sulfonic acid resin complex plus 300 gms. phenyltoloxamine sulfonic acid resin complex are stirred into 500 ml. of 35% grain alcohol containing 200 grams of sucrose and 10 grams of carboxy methyl cellulose plus flavoring and coloring. After blending, the resultant suspension is diluted to one liter with water.

Particularly satisfactory results, as above disclosed, have been obtained by reacting sulfonic acid cation exchange resins with narcotic morphine compounds. Resin adsorption compounds have also been made by reacting sulfonic acid cation exchange resins with narcotine. The compound has been made and tested. The test showed that the resin adsorption compound of narcotine was suitable.

The synergistic effect obtained with phenyltoloxamine, diphenhydramine, and other dialkylamino ethoxy antihistamines appears to be a general one for the usual morphine compounds, such as morphine, dihydromorphinone, codeine, dihydrocodeine, dihydrocodeinone, dihydrohydroxycodeinone, and morpholinoethyl morphine. It also appears, although it has not been conclusively established, that there is some synergistic effect obtained with all narcotic morphine compounds including the morphinans, such as dextromethorphan, racemorphan and N-methylmorphinan.

This synergistic effect is obtained with the drug bases, their common salts, and the resinates. The resinates, such as the reaction products of the drug base, with the sulfonic acid cation exchange resin, are particularly suitable in that they have a sustained acting synergistic effect.

While I have described certain preferred embodiments of my invention, many modifications thereof may be made without departing from the spirit of the invention; and I do not wish to be limited to the detailed examples, formulas, and proportions of ingredients herein set forth, but desire to avail myself of all changes within the scope of the appended claims.

I claim:

1. A pharmaceutical composition comprising a mixture of a sulfonic acid cation exchange resin having adsorbed thereon a cation of a narcotic selected from the group consisting of morphine, codeine, dihydrocodeine, morpholinoethyl morphine, and dihydrocodeinone, and a sulfonic acid cation exchange resin having adsorbed thereon a cation of a dialkylamino ethoxy antihistamine.

2. An antitussive pharmaceutical composition comprising a mixture of a sulfonic acid cation exchange resin having adsorbed thereon a cation of dihydrocodeinone and a sulfonic acid cation exchange resin having adsorbed thereon a cation of a dialkylamino ethoxy antihistamine.

3. An antitussive pharmaceutical composition comprising a mixture of a sulfonic acid cation exchange resin having adsorbed thereon a cation of morpholinoethyl morphine and a sulfonic acid cation exchange resin having adsorbed thereon a cation of a dialkylamino ethoxy antihistamine.

4. An antitussive pharmaceutical composition comprising an aqueous suspension of a mixture of a sulfonic acid cation exchange resin having adsorbed thereon a cation of dihydrocodeinone and a sulfonic acid cation exchange resin having adsorbed thereon a cation of a dialkylamino ethoxy antihistamine.

5. An antitussive pharmaceutical composition in dosage unit form comprising a sulfonic acid cation exchange resin having adsorbed thereon a cation of dihydrocodeinone in an amount on the basis of the dihydrocodeine of from 1 mg. to 60 mg. and a sulfonic acid cation exchange resin having adsorbed thereon a cation of a dialkylamino ethoxy antihistamine in an amount on the basis of the antihistamine of from 5 mg. to 200 mg.

6. An antitussive preparation, comprising a narcotic morphine compound selected from the group consisting of morphine, codeine, dihydrocodeine, morpholinoethyl morphine, and dihydrocodeinone and a potentiating amount of a dialkylamino ethoxy antihistamine.

7. An antitussive pharmaceuteal composition comprising a mixture of a sulfonic acid cation exchange resin having adsorbed thereon a cation of dextromethorphan, and a sulfonic acid cation exchange resin having adsorbed thereon a cation of a dialkylamino ethoxy antihistamine.

References Cited in the file of this patent

UNITED STATES PATENTS

| 2,498,687 | Larson | Feb. 28, 1950 |
| 2,673,827 | Kohlstaedt | Mar. 30, 1954 |
| 2,697,059 | Gustus | Dec. 14, 1954 |

OTHER REFERENCES

Martin: Ion Exchange and Adsorption Agents in Medicine, Little Brown and Co., Boston, 1955, pp. 62–66.

Amberlite Ion Exchange, Rohm and Haas Co., Phila., 1953, pp. 11 and 12.

Merck Index, 6th Ed., Merck and Co., Rahway, N.J., 1952, pp. 345, 650–652 and 742.

(Other references on following page)

OTHER REFERENCES

Winters: A New Unit Operation for the Drug Manufacturer, Drug and Allied Industries, July 1950, pp 19–24.

Amberlite, Ion Exchange Resins, Rohm and Haas Co., Phila., 1949, Entries "IR–120" and "IRC–50."

Chaundry, J. Pharm. of Pharmacol., vol. 8, November 1956, pp 975–986.

Freed: Annals Int. Med., vol. 44, 1956, pp. 1136–1141.

Chan: Am. J. Med. Sci., 234:2, August 1957, pp 207–212, 226.

Abrahams: The Lancet II:7009, December 28, 1957, pp. 1317–1318.

U.S. Dispensatory 25 (1957), pp. 1264–1265, 854–855.